Aug. 21, 1928.
D. PARKER
1,681,556
WASHING AND DRYING APPARATUS
Filed May 9, 1927     2 Sheets-Sheet 1
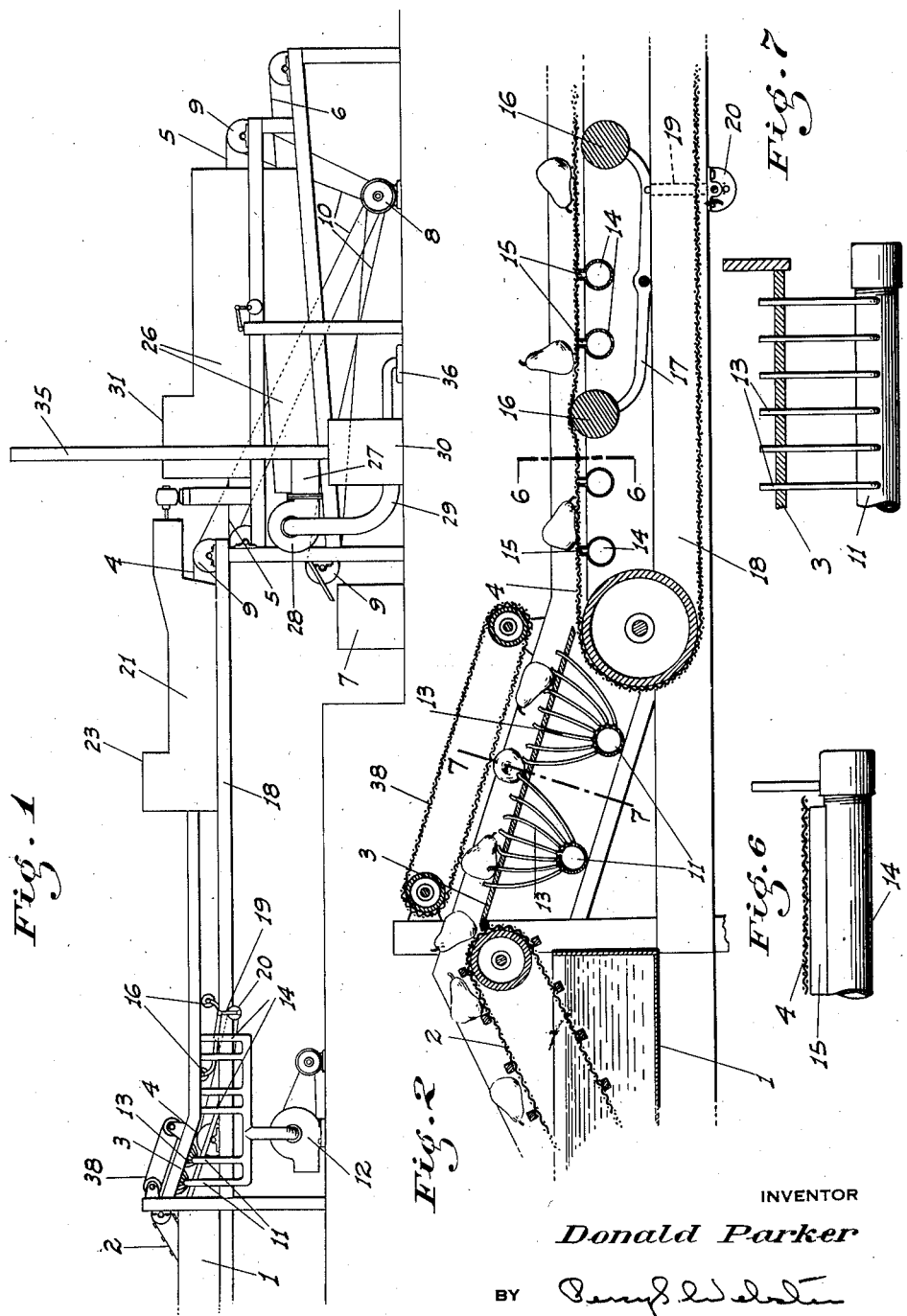
INVENTOR
*Donald Parker*
BY
ATTORNEY

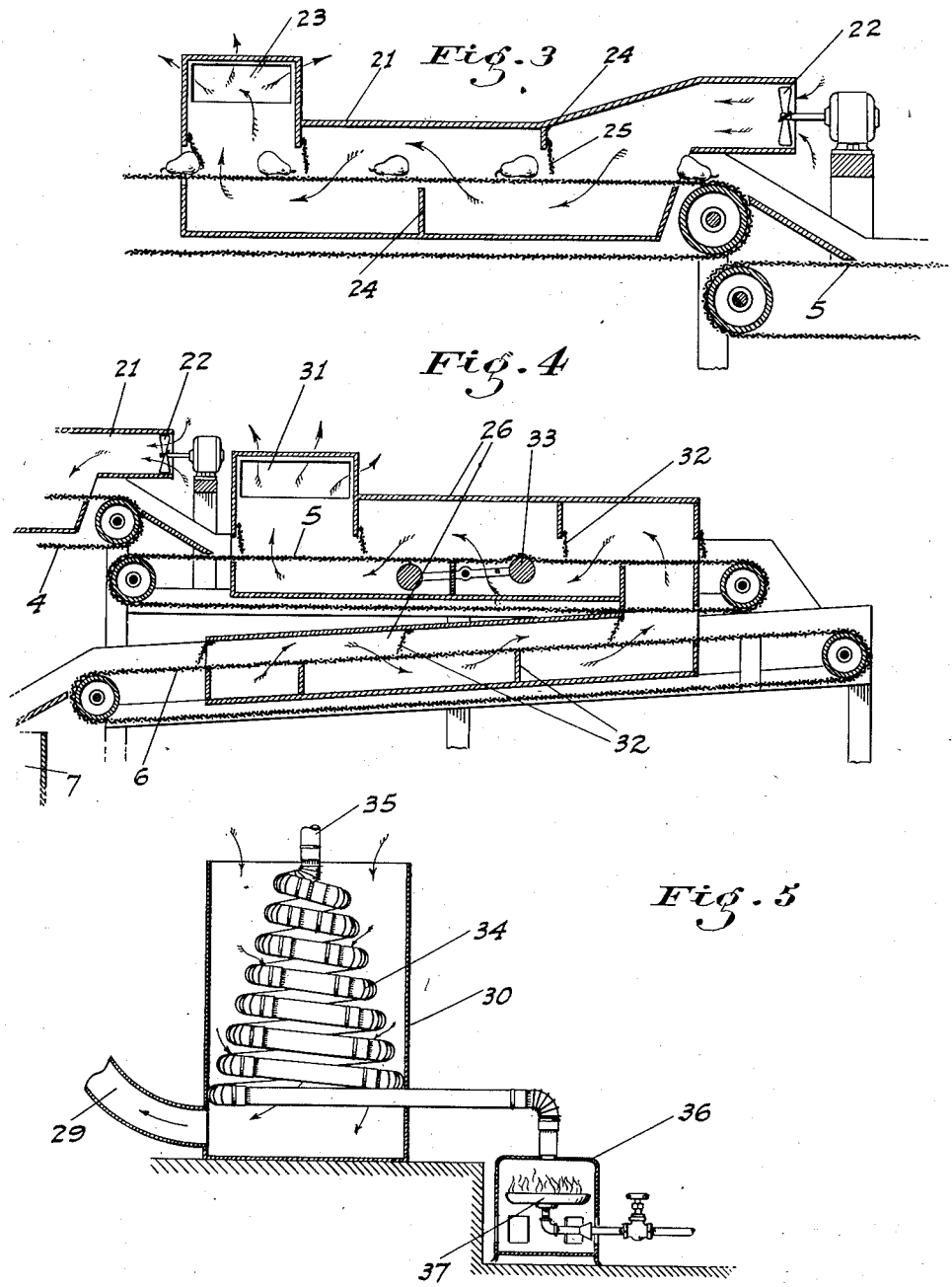

Patented Aug. 21, 1928.

1,681,556

UNITED STATES PATENT OFFICE.

DONALD PARKER, OF FRESNO, CALIFORNIA.

WASHING AND DRYING APPARATUS.

Application filed May 9, 1927. Serial No. 189,908.

This invention relates to improvements in devices for washing and drying food products such as fresh fruit, particularly pears; grains such as rice and the like; and prepared cereal products such as macaroni, spaghetti, etc., and any products of a like nature which are initially moist when manufactured or which must be washed before being marketed.

My apparatus has been shown herein as being constructed for use with pears, but the same structure with obvious slight alterations necessary to suit the different products, may be also advantageously used in connection with the above mentioned and other products. In treating pears it is found necessary at times to spray the same while growing on the trees. The spray substance, usually of a poisonous nature, must be washed off when the pears are picked in order for them to pass inspection and permit them to be marketed. The pears however have a bud hollow or cavity at one end in which the washing liquid collects and which liquid cannot be removed by ordinary drying methods. If the liquid is not thoroughly dried out however the fruit is liable to decay. The same holding of the moisture also occurs with other products such as those above mentioned on account of their peculiar nature or of the method of manufacture employed, and which moisture must be thoroughly removed in order to insure the subsequent keeping qualities of the product.

The principal object of my invention therefore is to provide a washing and drying apparatus (particularly the latter) so constructed that the moisture will be positively drawn from all depressions, cavities and the like in the products so that when the latter are finally delivered from the apparatus they are thoroughly dried and in a proper condition to be then marketed.

These objects I accomplish by means of such structure and relative arrangement of parts as will fully appear by a perusal of the following specification and claims.

In the drawings similar characters of reference indicate corresponding parts in the several views:

Fig. 1 is a side elevation of the complete apparatus.

Fig. 2 is an enlarged sectional elevation of the initial or receiving end of the drying apparatus.

Fig. 3 is an enlarged sectional elevation of one of the air drying units of the apparatus.

Fig. 4 is a similar view of the final air drying unit of the apparatus.

Fig. 5 is a side view of an improved form of air heating device.

Fig. 6 is a fragmentary cross section on the line 6—6 of Fig. 2.

Fig. 7 is a similar view on the line 7—7 of Fig. 2.

Referring now more particularly to the characters of reference on the drawings, the numeral 1 denotes a washing tank of suitable nature from which the produce as washed is delivered onto a sloping apron 3 by means of a conveyor 2. The apron 3 delivers onto one end of an endless horizontal draper 4 made of foraminous material such as flexible wire screening of suitable mesh. The draper 4 in turn delivers at its opposite end onto one end of a foraminous draper 5 of a similar nature to the draper 4. The opposite end of the draper 5 delivers onto another like draper 6 which returns under the draper 5 at an angle thereto and delivers at its lower end into a suitable receptacle 7.

Any desired driving means may be employed for driving the various drapers so that their upper runs will travel toward their discharge ends, such means in the present case being shown conventionally as an electric motor 8 connected to one of the end rollers 9 of the various drapers by suitable belting 10 or other connection means. The particular form of operating or driving mechanism however forms no part of my invention.

Positioned under the apron 2 and extending transversely thereof in longitudinal spaced relation are pipes 11 closed at one end and connected at the other end to the intake of a suction fan 12. Small flexible tubes 13 preferably of rubber and open on their upper ends project upwardly from the pipes and extend through the apron a certain distance, said tubes being somewhat closely spaced both longitudinally and transversely of the apron so as to be distributed evenly over practically the entire area thereof. The upper ends of these tubes tend to yieldably project into the holes or cavities in the pears passing down over the apron, so that with the suctional force exerted through these tubes all the liquid in the cavities will be drawn therefrom and only the surface moisture will remain on the fruit. The tubes being flexible they can yield as the fruit passes over the same and will not hinder the passage of the fruit down the apron.

Positioned under the head end of the draper 4 are other transverse pipes 14 also connected to the intake of the fan 12 and having longitudinal slots 15 at the top terminating immediately adjacent the under surface of the draper. These pipes withdraw the majority of the surface moisture remaining on the fruit passing over the slots, and also any in the cavities of the fruit not drawn out by the tubes. These pipes are arranged as longitudinally spaced sets and between the sets and also beyond the rear set are transverse rollers 16, disposed under the draper and mounted on common rocking arms 17 which are pivoted intermediate their ends on the supporting framework 18 of the structure. These arms are reciprocated so that the rollers will be alternately raised and lowered by means of links 19 connected to said arms and to driven eccentrics 20. The rollers then bulge up the surface of the draper somewhat as shown so that the pears traveling along said draper will be disturbed and their positions altered, so as to enable the rear set of pipes to act on the surface of the fruit not in the sphere of action of the first set of pipes. Beyond the agitating rollers the upper run of the draper 4 passes through a longitudinal drying air box 21. The intake of the box is at the rear end of and above the draper and has a fan 22 projecting therein to drive air at atmospheric temperature through the box toward the outlet 23 thereof which is at the opposite end. Intermediate its ends the box has longitudinally and vertically staggered baffles 24, disposed above and below the upper run of the draper, and arranged so that air from the intake must alternately pass through the draper from above and below to reach the outlet. By this means a drying effect is had on both sides of the fruit equally, as will be evident. The upper baffles are provided with flexible flaps 25 so that the fruit can pass thereby without normally leaving openings sufficiently large to permit of a direct and undesired horizontal travel of an appreciable amount of the air.

As the fruit leaves the air box and drops onto the draper 5 it passes into a warm air box 26 through which the upper run of the draper 5 travels and through which the upper run of the draper 6 also travels. This air box has its intake at its lower end or adjacent the discharge end of the lower draper 6. This intake is connected to the discharge 27 of a blower 28 whose intake 29 leads to a casing 30 in which air is maintained in a suitably heated condition. The heating means which is of special form will be hereinafter described in detail.

The air box 26 from its intake to its outlet 31 (which is at the end where the draper 5 enters the box) is provided with longitudinally and staggered baffles 32, disposed above and below the upper runs of the two drapers and so arranged that air from the intake must pass alternately and continuously lengthwise of the drapers 6 and 5 from above and below the same, to reach the outlet. The direction of movement of the air is opposite to the direction of travel of the fruit on the drapers so that when said fruit reaches the discharge end of the draper 6 it is subjected to the dryest and warmest air and is also by that time in a thoroughly dried condition. The baffles above the drapers are of a yieldable nature for the same reasons stated in connection with those in the box 21. In connection with the draper 5, I also provide agitating rollers 33 which are alternately raised and lowered in the same manner and for the same purpose as described in connection with the rollers 16. The drapers 4 and 5 are separate members so as to enable the speeds to be different from each other if desired; while the draper 6 is returned under the draper 5 so as not to make the apparatus unduly lengthy.

Means for heating the air in the casing 30 (which is freely open at the top) comprises a spiral or cone-shaped coil of vertically spaced pipe or tubing 34, such as stovepipe, the lowest turn of the coil having a close fit with the casing and the air intake 29 of the blower 28 communicating with said casing under the lowermost coil. The uppermost turn of the coil terminates in a vertical discharge stack 35 of suitable height. The lowest turn of the coil extends to a hood 36 outside the casing which is disposed over a gas or similar burner 37, the coil structure actually serving as a continuous flue for the products of combustion of the burner. By means of this construction air for the blower can only enter the same by passing through the casing at the top and thence downwardly to the intake 29. To reach said intake 29 however the air must first pass between the coil spaces, since as stated the lowermost turn of the coil makes a close fit with the casing so as to permit of only a very slight amount of air passing therebetween. By reason of this arrangement the heat will be correspondingly imparted to the air as it travels down to the blower intake, so that such air absorbs all possible heat from the fuel burnt. I have found from actual experience that by the time the products of combustion reach the stack they are practically cold, showing that all possible heat has been transferred to the air. Since the air used in the drying boxes does not come in contact with the gas burner or the products of combustion created thereby, no harmful flavor will of course be imparted to the fruit. Since it is not necessary that the air be very hot, inasmuch as only the surface of the fruit is to be dried and not the fruit itself, but very little fuel need be used to operate the heater.

In connection with the apron 3, I may use if necessary a means for controlling the speed of the matter passing down the same. Such a means is especially needed in connection with pears, which do not tend to roll readily, and preferably comprises an endless inverted screen conveyor 38. This conveyor is positioned above and parallel to the apron, and is set to gently engage the top of the fruit on the apron. Not only therefore are the pears caused to positively roll down the apron, but their speed may be altered by varying the speed of the conveyor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A drying apparatus including a foraminous longitudinally moving draper on which the produce to be dried is supported, transversely extending and longitudinally spaced suction pipes under the draper having openings facing the draper, and means for agitating and disturbing the setting of the produce on the draper, disposed intermediate the pipes.

2. A drying apparatus including a foraminous longitudinally moving draper on which the produce to be dried is supported, transversely extending and longitudinally spaced suction pipes under the draper having openings facing the draper, and means operating on the draper between the pipes for causing the produce on the draper to be changed in position intermediate its movement from over one pipe to the other.

3. A drying apparatus including a foraminous longitudinally moving draper on which the produce to be dried is supported, transversely extending and longitudinally spaced suction pipes under the draper having openings facing the draper, a transverse roller mounted under the draper between the pipes, and means for reciprocating said roller in a vertical direction to cause the same to engage and bulge up the draper, the latter being of flexible material.

4. A drying apparatus including a supporting element along which the produce to be dried is moved, and a plurality of suction nozzles projecting from the upper surface of said element and distributed in closely spaced relation over the area thereof.

5. A drying apparatus including a supporting element along which the produce to be dried is moved, and a plurality of flexible suction nozzles projecting upwardly through the element to terminations a certain distance above the element.

6. A drying apparatus including a draper along which the produce to be dried passes, longitudinally separated means for removing moisture from the produce as it moves along the draper, and means for disturbing the setting of the produce on the draper intermediate the moisture removing means.

7. A drying apparatus including an apron along which the produce to be moved is dried, and a plurality of suction nozzles arranged in connection with the apron for actual contact with the produce to drain liquid from the surface cavities of the produce.

8. A drying apparatus including an apron along which the produce to be moved is dried, and a plurality of flexible suction nozzles arranged in connection and projecting above the surface of the apron for actual engagement with the produce to drain liquid from the surface cavities of the produce, a foraminous draper onto which the produce passes from the apron and after being acted on by the nozzles, and transverse suction pipes under the draper having openings therealong and facing the draper for removing surface moisture from the produce.

In testimony whereof I affix my signature.

DONALD PARKER.